United States Patent [19]

Light, Jr.

[11] E Re. 30,090

[45] Reissued Sep. 4, 1979

[54] POLYMERIZATION OF VINYL CHLORIDE WITH BLENDS OF PEROXIDE INITIATORS

[75] Inventor: Rupert E. Light, Jr., Williamsville, N.Y.

[73] Assignee: Pennwalt Corporation, Philadelphia, Pa.

[21] Appl. No.: 374,446

[22] Filed: Jun. 28, 1973

Related U.S. Patent Documents

Reissue of:

[64] Patent No.: 3,736,306
Issued: May 29, 1973
Appl. No.: 72,148
Filed: Sep. 14, 1970

[51] Int. Cl.[2] ..... C08F 4/38

[52] U.S. Cl. ..... 526/223; 526/330; 526/344.2

[58] Field of Search ..... 260/87.1, 87.5 R, 92.8 W; 526/223

[56] References Cited

U.S. PATENT DOCUMENTS

| | | | |
|---|---|---|---|
| Re. 25,763 | 4/1965 | Marous et al. | 260/92.8 |
| 3,205,204 | 9/1965 | Heckmaier et al. | 260/87.1 |
| 3,373,150 | 3/1968 | Pears et al. | 260/92.8 |
| 3,420,807 | 1/1969 | Harrison et al. | 260/92.8 |
| 3,717,621 | 2/1973 | Hauss et al. | 526/223 |

*Primary Examiner*—Stanford M. Levin
*Attorney, Agent, or Firm*—Carl A. Hechmer, Jr.

[57] ABSTRACT

Process for the polymerization of vinyl chloride or the copolymerization of vinyl chloride and vinyl acetate at temperatures of less than about 70° C., in the presence of a polymerization initiator which is a blend of an acetyl alkylsulfonyl peroxide with (A) a peroxydicarbonate, (B) a diacyl peroxide and a tertiary-alkyl neoacid peroxyester or (C) a diacyl peroxide and a peroxydicarbonate.

17 Claims, No Drawings

POLYMERIZATION OF VINYL CHLORIDE WITH BLENDS OF PEROXIDE INITIATORS

Matter enclosed in heavy brackets [ ] appears in the original patent but forms no part of this reissue specification; matter printed in italics indicates the additions made by reissue.

*This application is a reissue application of U.S. Patent No. 3,736,306, issued May 29, 1973 from U.S. Serial No. 72,148, filed September 14, 1970.*

This invention relates to the polymerization of vinyl chloride or to the copolymerization of vinyl chloride and vinyl acetate in the presence of special preoxy initiators, and more particularly it relates to the use of blends of such initiators to provide an improved polymerization reaction.

It is well known that peroxy compounds are capable of causing the polymerization of various vinyl monomers, included among which is vinyl chloride. Generally, it is necessary to control the temperature of the reaction in order to initiate the polymerization, and later to remove heat from the exothermic reaction in order to keep the polymerization rate under control. If the reaction temperature and, therefore, the polymerization rate, is not controlled, the product is usually not uniform in its characteristics. In order to control the reaction temperature, it has been necessary to provide much larger capacities for heating and for cooling the reacting mixture than would be necessary if the polymerization proceeded at a more uniform rate. These difficulties have resulted in much research effort designed to determine how to modify the process in order to produce uniformity in the polymerization rate.

It has now been found that if the polymerization is initiated by certain blends of four types of peroxy compounds, the polymerization rate is remarkably steady and uniform. Many, if not all, of the specific compounds falling within these four types are known to be capable of initiating the polymerization of vinyl compounds. Furthermore, the prior art has taught that when particular ones of these peroxy compounds are mixed the result is an improved polymerization initiator for certain desired purposes. None of these prior art mixtures, however, has been able to achieve a polymerization rate with the uniformity comparable to that obtained by the novel initiators of the present invention.

In the process of the present invention, certain combinations of the following peroxy compounds as two component or three-component mixtures are employed as polymerization initiators:

(a) an acetyl alkylsulfonyl peroxide
(b) a peroxy dicarbonate
(c) a diacyl peroxide
(d) a tertiary-alkyl neoacid peroxyester.

Each of the special combinations of the above peroxy compounds as described herein will polymerize vinyl chloride or copolymerize vinyl chloride and vinyl acetate at a uniform rate of polymerization and produce a highly acceptable product. In the prior art, certain ones or mixtures of the above peroxy compounds have been employed. U.S. 2,464,062 (Strain), teaches that organic peroxy dicarbonates can be used to polymerize vinyl monomers of many types, includes vinyl chloride and vinyl acetate. U.S. 3,205,204 (Heckmaier et al.), teaches that a mixture of diacyl peroxides with acetyl cyclohexane sulfonyl peroxide will polymerize vinyl chloride.

U.S. 3,420,807 (Harrison et al.), teaches that tertiary-butyl peresters can be used to polymerize vinyl chloride. As is shown below, however, none of these initiator systems provides the desired uniform rate of polymerization.

In accordance with the present invention, there is provided an improved process for homopolymerizing vinyl chloride or copolymerizing vinyl chloride and vinyl acetate at a temperature of not more than 70° C., in the presence of 0.005% to 1.0% by weight of the monomers to be polymerized of a peroxide polymerization initiator which is a mixture of peroxides selected from the group consisting of:

(1) a mixture of (a) an acetyl alkylsulfonyl peroxide having the formula

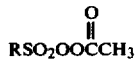

and (b) a peroxy dicarbonate having the formula

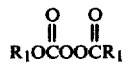

(2) a mixture of (a) said acetyl alkylsulfonyl peroxide, (b) a diacyl peroxide having the formula

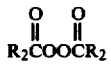

and (c) a tertiary-alkyl neoacid peroxy ester having the formula

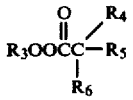

(3) a mixture of (a) said acetyl alkylsulfonyl peroxide, (b) said diacyl peroxide, and (c) said peroxy dicarbonate;

wherein

R is alkyl of 4–12 carbon atoms, cycloalkyl of 3–12 carbon atoms, or 1-adamantyl;

$R_1$ is alkyl of 2–18 carbon atoms, cycloalkyl of 3–12 carbon atoms, or benzyl;

$R_2$ is primary alkyl of 2–17 carbon atoms;

$R_3$ is tertiary alkyl of 4–8 carbon atoms; and $R_4$, $R_5$ and $R_6$ are each alkyl of 1–6 carbon atoms.

The process of this invention relates to the homopolymerization of vinyl chloride, or to the copolymerization of vinyl chloride with vinyl acetate wherein the vinyl chloride constitutes at least 50% by weight of the polymerized comonomers.

The polymerization process operates at temperatures of not more than 70° C., preferably from about 30° to about 70° C., and most desirably in the range of 40° to 60° C. [Generally, the] *The* polymerization takes place

[in a medium which is in the form of an emulsion, or] in the form of a suspension in an aqueous liquid.

The peroxy compounds which are components in the initiator mixtures of this invention are any of the special types, which are listed above. The acetyl alkylsulfonyl peroxide is one in which the alkyl group may be cyclic or acyclic. Illustrative of the operable acetyl alkylsulfonyl peroxides are those in which the alkyl group is cyclohexyl, 1-methylcyclohexyl, cyclopentyl, sec-butyl, sec-pentyl, sec-hexyl, t-butyl, t-amyl, t-pentyl, t-hexyl, t-heptyl, 1,1-dimethyldecyl, and 1-adamantyl.

Acetyl t-amylsulfonyl peroxide may be prepared by sulfoxidizing isopentane in the presence of acetic anhydride at 0° C. using a sun lamp as a source of actinic light for the process. This peroxide and methods for the preparation of a series of tertiary alkyl sulfonyl peroxides are described in co-pending patent application Ser. No. 722,418, filed Oct. 31, 1968 (now U.S. Pat. No. 3,586,722 issued June 21, 1971), assigned to the same assignee.

The secondary alkyl sulfonyl peroxides may be prepared using the procedure of Graf Ann, 578, 50–82 (1952).

The diacyl peroxides encompass among other propionyl, decanoyl, lauroyl, pelargonyl, di(3,5,5-trimethylhexanoyl), and stearoyl peroxides.

The peroxydicarbonates include among others, diethyl, diisopropyl, di-n-propyl, di-n-butyl, di-sec-butyl, di-2-ethylhexyl, di-hexadecyl, dicyclohexyl, and dibenzyl peroxy-dicarbonates.

Among the t-alkyl neoacid peroxyesters may be mentioned, t-butyl peroxypivalate, t-butyl peroxyneodecanoate, 1,1,3,3-tetramethylbutyl peroxypivalate, and 1,1,3,3-tetramethylbutyl peroxyneoheptanoate. It is of course understood that the foregoing specific compounds which have been mentioned are intended to be illustrative and not to limit the types of compounds included in the generic language.

The concentration of the polymerization initiator mixture which is employed is generally from about 0.005 to about 1.0% by wight of the monomers to be polymerized. A more preferred range for the initiator concentration is 0.01 to 0.5%, and the most desirable is 0.02 to 0.2%.

The proportions between components of peroxy compounds in any one mixture varies somewhat, depending upon whether the mixture is a two- or a three-component mixture. It is most convenient to express these proportions as ranges of weight ratios. In the two-component system the proportion of acetyl alkylsulfonyl peroxide to peroxy dicarbonate is from 1/0.2 to 1/4. In the three-component system which includes the tertiary-alkyl neoacid peroxyester the proportion of acetyl alkylsulfonyl peroxide to diacyl peroxide is from 1/0.25 to 1/7 and the proportion of acetyl alkylsulfonyl peroxide to tert.-alkyl neoacid peroxy-ester is 1/0.25 to 1/5. In the three-component system which includes the peroxy dicarbonate the proportion of acetyl alkylsulfonyl peroxide to diacyl peroxide is from 1/0.25 to 1/7, and the proportion of acetyl alkylsulfonyl peroxide to peroxy dicarbonate is from 1/0.25 to 1/5.

In the following example, certain specific embodiments of this invention are illustrated. Unless otherwise noted, parts and percentages are by weight and temperatures are in degrees centigrade. These examples show the effect of various peroxy compounds when used alone as taught in the prior art and when used in the combinations taught in the prior art to polymerize vinyl chloride. In the first series, Examples 1–15, individual peroxy compounds are employed as initiators in the polymerization of vinyl chloride, and no one of these initiators produces a uniform rate of polymerization. In Examples 16–23, eight of the specific mixtures are peroxides which are employed within the process of this invention are shown in the polymerization of vinyl chloride to produce uniform rates of polymerization. in Examples 24–26, three mixtures of peroxy compounds, which are taught in the recent prior art, are employed in the polymerization of vinyl chloride, and they likewise fail to produce a uniform rate of polymerization. And finally, Example 27 shows the copolymerization of vinyl chloride and vinyl acetate, employing the initiator mixture of Example 16 and producing a uniform rate of polymerization. In all of these examples, comparisons have been made by determining the percent of conversion per hour during the polymerization reaction and determining the number of hours required to reach 90% conversion. When the percent conversion per hour remains substantially constant, the rate of polymerization is considered to be uniform.

The process of this invention provides the capability of obtaining the maximum production from a polymerization reactor because it can be designed with a specific heat transfer capacity. Some vinyl polymerizations tend to run at a high rate in the initial stages and to slow down during the later stages of the reaction, while others tend to increase the rate of reaction as time passes and perhaps to increase the rate to such an extent that a "runaway" reaction results. If the mixtures of peroxide initiators of this invention are employed, a maximum utility and a maximum efficiency are achieved.

EXAMPLES 1–15

Suspension polymerization of vinyl chloride with single initiators

A standard procedure was employed for all the examples. An aqueous suspension medium was added to 12 oz. clear bottles; the standard medium had the following composition:

| | Ml. |
|---|---|
| Water, deionized | 105 |
| Methyl cellulose, 1% aqueous solution | 10 |
| Sorbitan monostearate 1% aq. solution | 5 |
| Polyoxyethylene sorbitan monostearate, 1% aq. solution | 5 |

The bottles were charged with the medium and held at −20° C. until the contents were frozen. Then the desired amount of peroxide was added to the bottles. Then 50 g. of liquid vinyl chloride monomer was charged, at about −15° C. The bottles were then capped using an inert seal. The capped bottles were enclosed in a safety cage and stored in a box containing solid carbon dioxide until time to start the polymerization. Ten bottles were made up for each of the fifteen initiators shown in Table I. The bottles in their safety cages were placed in a tumbling device immersed in a constant temperature bath held at 50° C. The bottles were tumbled at 30 revolutions per minute for the desired reaction times. A bottle was removed from the bath every hour or every 1½ hours for the duration of the polymerization. The bottles were cooled to about 0° C. and the residual monomer was vented by way of a hypodermic syringe needle, through the cap. The bottles were weighed to determine the amount of polymer obtained. A percent conversion vs. time graph was drawn for each peroxide and the percent conversion per hour was determined.

initiator blends of these examples were superior to any individual component of Examples 1–15 in giving a more uniform percent conversion per hour.

TABLE II

Suspension polymerization of vinyl chloride at 50° C. with initiator blends

| Ex. | Peroxide combination | G./100 g. VCl | Wt. proportions | Percent conversion per hour for each experiment 1 | 2 | 3 | 4 | 5 | 6 | 7 | 8 | 9 | 10 | 90% conv., hours |
|---|---|---|---|---|---|---|---|---|---|---|---|---|---|---|
| 16 | Acetyl cyclohexylsulfonyl peroxide | 0.0204 | 1.0 | 11 | 11 | 11 | 11 | 11 | 11 | 11 | 11 | | | 8.3 |
| | Diisopropyl peroxydicarbonate | 0.0081 | 0.4 | | | | | | | | | | | |
| | Acetyl cyclohexylsulfonyl peroxide | 0.010 | 1.0 | 11 | 13 | 13 | 13 | 13 | 13 | 13 | | | | 6.9 |
| | Di(n-propyl) peroxydicarbonate | 0.018 | 1.8 | | | | | | | | | | | |
| 18 | Acetyl cyclohexylsulfonyl peroxide | 0.027 | 1.0 | 13 | 13 | 13 | 13 | 13 | 13 | 13 | | | | 6.7 |
| | Dibenzyl peroxydicarbonate | 0.019 | 0.7 | | | | | | | | | | | |
| 19 | Acetyl 1-metnylcyclohexylsulfonyl peroxide | 0.0183 | 1.0 | 10 | 10 | | 10 | 8 | 8 | 8 | 8 | 8 | 8 | 10.3 |
| | Dicyclohexyl peroxydicarbonate | 0.0110 | 0.6 | | | | | | | | | | | |
| 20 | Acetyl cyclohexylsulfonyl peroxide | 0.0140 | 1.0 | 11 | 11 | 11 | 11 | 11 | 11 | 11 | 11 | | | 8.3 |
| | Lauroyl peroxide | 0.0875 | 6.2 | | | | | | | | | | | |
| | t-Butyl peroxypivalate | 0.0380 | 2.7 | | | | | | | | | | | |
| 21 | Acetyl t-amylsulfonyl peroxide | 0.0146 | 1.0 | 11 | 11 | 11 | 11 | 11 | 11 | 11 | 11 | | | 8.3 |
| | Di(3,5,5-trimethylhexanoyl) peroxide | 0.0398 | 2.7 | | | | | | | | | | | |
| | t-Butyl peroxyneodecnoate | 0.0236 | 1.6 | | | | | | | | | | | |
| 22 | Acetyl sec-heptylsulfonyl peroxide | 0.0246 | 1.0 | 10 | 11 | 11 | 11 | 11 | 11 | 11 | 11 | | | 8.4 |
| | Pelargonyl peroxide | 0.0098 | 0.4 | | | | | | | | | | | |
| | 1,1,3,3-tetramethylbutyl peroxypivalate | 0.0094 | 0.4 | | | | | | | | | | | |
| 23 | Acetyl cyclohexylsulfonyl peroxide | 0.0153 | 1.0 | 9 | 10 | 10 | 10 | 10 | 10 | 10 | 10 | 10 | | 9.0 |
| | Lauroyl peroxide | 0.060 | 3.9 | | | | | | | | | | | |
| | Di-sec butyl peroxydicarbonate | 0.010 | 0.7 | | | | | | | | | | | |

None of these 15 initiators gave a uniform rate of conversion to 90% conversion.

EXAMPLES 24–26

TABLE I

Suspension polymerization vinyl chloride at 50° C. with single initiators

| Example | Peroxide | g/100 g. VCl | Percent conversion per hour 1 | 2 | 3 | 4 | 5 | 6 | 7 | 8 | 9 | 10 | 11 | 90% conv., hours |
|---|---|---|---|---|---|---|---|---|---|---|---|---|---|---|
| 1* | Acetyl cyclohexylsulfonyl peroxide | 0.025 | 11 | 11 | 11 | 10 | 10 | 9 | 9 | 8 | 7 | 4 | | 10 |
| 2 | Diisopropyl peroxydicarbonate | 0.025 | 3 | 6 | 8 | 10 | 11 | 13 | 13 | 13 | 14 | | | 9 |
| 3* | t-Butyl peroxypivalate | 0.075 | 2 | 4 | 7 | 8 | 10 | 11 | 12 | 13 | 12 | 8 | 3 | 11 |
| 4* | Lauroyl peroxide | 0.35 | 0 | 2 | 3 | 5 | 5 | 7 | 7 | 10 | 12 | 15 | 18 | 11.3 |
| 5 | Acetyl 1-methylcyclohexylsulfonyl peroxide | 0.0356 | 19 | 18 | 11 | 9 | 7 | 7 | 8 | 7 | 7 | | | 8.8 |
| 6 | Acetyl t-amylsulfonyl peroxide | 0.0348 | 22 | 16 | 12 | 8 | 6 | 5 | 7 | 6 | 7 | | | 9.1 |
| 7 | t-Butyl peroxyneodecanoate | 0.0598 | 3 | 6 | 9 | 11 | 13 | 15 | 16 | 10 | 5 | 2 | | 10 |
| 8 | 1,1,3,3-tetramethylbutyl peroxypivalatet | 0.1002 | 5 | 8 | 12 | 15 | 20 | 19 | 10 | | | | | 7.3 |
| 9 | Acetyl sec-heptylsulfonyl peroxide | 0.0302 | 12 | 12 | 13 | 11 | 11 | 10 | 10 | 10 | | | | 8.1 |
| 10* | Di(3,5,5-trimethylhexanoyl) peroxide | 0.20 | 2 | 4 | 5 | 6 | 7 | 7 | 9 | 9 | 10 | 12 | 15 | 11.3 |
| 11* | Pelargonyl peroxide | 0.30 | 3 | 4 | 5 | 5 | 6 | 7 | 8 | 10 | 10 | 11 | 15 | 11.3 |
| 12 | Di(cyclohexyl) peroxydicarbonate | 0.0486 | 6 | 10 | 13 | 14 | 15 | 15 | 17 | | | | | 7.0 |
| 13 | Di(benzyl) peroxydicarbonate | 0.0900 | 6 | 11 | 12 | 14 | 14 | 15 | 16 | | | | | 7.1 |
| 14* | Di(sec-butyl) peroxydicarbonate | 0.025 | 5 | 7 | 8 | 10 | 10 | 11 | 11 | 11 | 11 | 6 | | 10 |
| 15 | Di(n-propyl) peroxydicarbonate | 0.0437 | 9 | 14 | 16 | 21 | 28 | | | | | | | 5.1 |

*In these experiments, bottles were removed from the polymerizer bath every 1.25 hours over a total time of 12.5 hours. In all other experiments bottles were removed hourly, up to 10 hours.

EXAMPLES 16–23

Suspension polymerization of vinyl chloride with multiple initiators

The procedure of Example 1 was repeated except that multiple initiators were used as shown in Table II. All eight combinations of initiators gave uniform or nearly uniform rates of polymerization. In all cases the

Suspension polymerization of vinyl chloride with multiple initiators described in prior art The procedure of Example 1 was repeated except that multiple initiators were used as shown in Table III. None of these systems described in the prior art using initiator blends gave a uniform rate of polymerization comparable to that of Examples 16–23.

TABLE III

Suspension polymerization of vinyl chloride at 50° C. with initiator blends (prior art)

| Ex. | Peroxide combination | G./100 g. VCl | Wt. proportions | Percent conversion per hour for each experiment conv., 1 | 2 | 3 | 4 | 5 | 6 | 7 | 8 | 9 | 10 | 90% conv. hours |
|---|---|---|---|---|---|---|---|---|---|---|---|---|---|---|
| 24* | t-Butyl poroxypivaiate | 0.0375 | 1.0 | 2 | 4 | 7 | 8 | 9 | 11 | 11 | 12 | 13 | 11 | 10.3 |
| | Lauroyl peroxide (U.S. Pat. No. 3,420,807) | 0.1750 | 4.7 | | | | | | | | | | | |
| 25 | Acetyl cyclohexylsulfonyl peroxide | 0.011 | 1.0 | 8 | 8 | 8 | 10 | 10 | 12 | 15 | 23 | | | 7.9 |
| | Lauroyl peroxide (U.S. Pat. No. 3,205,204) | 0.375 | 34.1 | | | | | | | | | | | |
| 26 | Diisopropyl peroxydicarbonate | 0.020 | 1.0 | 7 | 9 | 11 | 11 | 16 | 16 | 20 | | | | 7.0 |
| | Lauroyl peroxide (U.S. Reissue Pat. No. 25,763) | | | | | | | | | | | | | |

*In this experiment, bottles were removed from the polymerizer bath every 1.25 hours over a total time of 12.5 hours. In all other experiments bottles were removed hourly, up to 10 hours.

EXAMPLE 27

Suspension copolymerization of vinyl chloride and vinyl acetate with multiple initiators The procedure of Example 16 was repeated except that 15% of the vinyl chloride was replaced with vinyl acetate to give a copolymer of vinyl chloride and vinyl acetate. The results are shown in Table IV to be a uniform rate of polymerization.

TABLE IV

Suspension copolymerization of vinyl chloride-vinyl acetate (85:15) at 50° C.

| Example | Peroxide combination | G./100 g. VCl | Weight proportions | Percent conversion per hour for each experiment 1 | 2 | 3 | 4 | 5 | 6 | 7 | 8 | 9 | 10 | 90% conv. hours |
|---|---|---|---|---|---|---|---|---|---|---|---|---|---|---|
| 27 | Acetyl cyclohexylsulfonyl peroxide | 0.0902 | 1.0 | 13 | 15 | 15 | 15 | 15 | 15 | | | | | 6.2 |
| | Diisopropyl peroxydicarbonate | 0.0081 | 0.4 | | | | | | | | | | | |

Although the invention has been described in considerable detail with reference to certain preferred embodiments thereof, it will be understood that variations and modifications can be effected within the spirit and scope of the invention as described hereinabove, and as defined in the appended claims.

What is claimed is:

[1. In a proceess for the homopolymerization of vinyl chloride or the copolymerization of vinyl chloride and vinyl acetate, wherein the vinyl chloride constitutes at least 50% by weight of the comonomers, at a temperature of not more than 70° C. in the presence of an initiating amount of a peroxide polymerization initiator, the improvement which comprises using as said initiator a mixture of peroxides in the amount of 0.005% to 1.0% by weight of the monomer(s) being polymerized and being selected from the group consisting of:

(A) a mixture of (1) an acetyl alkylsulfonyl peroxide having the formula $$RSO_2OO\overset{O}{\overset{\|}{C}}CH_3$$

and (2) a peroxy dicarbonate having the formula $$R_1O\overset{O}{\overset{\|}{C}}OO\overset{O}{\overset{\|}{C}}OR_1$$

the weight proportions of component 1:component 2 being from 1:0.2 to 1:4, (B) a mixture of (1) said acetyl alkylsulfonyl peroxide, (2) a diacyl peroxide having the formula $$R_2C\overset{O}{\overset{\|}{O}}OO\overset{O}{\overset{\|}{C}}R_2$$

and (3) a tertiary-alkyl neoacid peroxyester having the formula $$R_3OO\overset{O}{\overset{\|}{C}}\underset{\underset{R_6}{|}}{C}\overset{R_4}{/}\!\!-R_5$$

the weight proportions of 1:2 being from 1:0.25 to 1:7 and of 1:3 being from 1:0.25 to 1:5, and (C) a mixture of (1) said acetyl alkylsulfonyl peroxide, (2) said diacyl peroxide, and (3) said peroxy dicarbonate, the weight proportions of 1:2 being from 1:0.25 to 1:7 and of 1:3 being from 1:0.25 to 1:5; wherein R is alkyl of 4–12 carbon atoms, cycloalkyl of 3–12 carbon atoms, or 1-adamantyl; $R_1$ is alkyl of 2–18 carbon atoms, cycloalkyl of 3–12 carbon atoms, or benzyl; $R_2$ is primary alkyl of 2–17 carbon atoms; $R_3$ is tertiary alkyl of 4–8 carbon atoms; and $R_4$, $R_5$ and $R_6$ are each of alkyl of 1–6 carbon atoms.]

[2. The process of claim 1 wherein the temperature is 30° C. to 70° C.]

[3. The process of claim 1 wherein said mixtures of peroxides is present in the amount of 0.01 to 0.5% by weight of the vinyl monomers to be polymerized.]

[4. The process of claim 3 wherein said amount is 0.02 to 0.2%.]

5. [The process of claim 1] *In a process for the suspension homopolymerization of vinyl chloride or the suspension copolymerization of vinyl chloride and vinyl acetate, wherein the vinyl chloride constitutes at least 50% by weight of the comonomers, at a temperature of not more than 70° C. in the presence of an initiating amount of a peroxide polymerization initiator, the improvement which comprises using as said initiator a mixture of peroxides in the amount of 0.005% to 1.0% by weight of the monomer(s) being polymerized* wherein said mixture of peroxides is a mixture of (A) an acetyl alkylsulfonyl peroxide having the formula

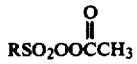

and (B) a peroxy dicarbonate having the formula

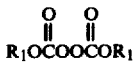

wherein R is alkyl of 4–12 carbon atoms, cycloalkyl of 3–12 carbon atoms, or 1-adamantyl; $R_1$ is alkyl of 2–18 carbon atoms, cycloalkyl of 3–12 carbon atoms, or benzyl, *provided, however, that when $R_1$ is an alkyl group of 3 carbon atoms it is n-propyl;* and the weight proportions of component (A) to component (B) are from 1/0.2 to 1/4.

6. The process of claim 5 wherein said initiator is a mixture of one part by weight of acetyl cyclohexylsulfonyl peroxide and 0.7 part by weight of dibenzyl peroxydicarbonate.

[7. The process of claim 5 wherein said initiator is a mixture of 1 part by weight of acetyl cyclohexylsulfonyl peroxide and 0.4 part by weight of diisopropyl peroxydicarbonate.]

8. The process of claim 5 wherein said initiator is a mixture of 1 part by weight of acetyl 1-methylclclohexylsulfonyl peroxide and 0.6 part by weight of dicyclohexyl peroxydicarbonate.

9. The process of claim 5 wherein said initiator is a mixture of 1 part by weight of acetyl cyclohexylsulfonyl peroxide and 1.8 parts by weight of di(n-propyl) peroxydicarbonate.

10. [The process of claim 1] *In a process for the suspension homopolymerization of vinyl chloride or the suspension copolymerization of vinyl chloride and vinyl acetate, wherein the vinyl chloride constitutes at least 50% by weight of the comonomers, at a temperature of not more than 70° C. in the presence of an initiating amount of a peroxide polymerization initiator, the improvement which comprises using as said initiator a mixture of peroxides in the amount of 0.005% to 1.0% by weight of the monomer(s) being polymerized* wherein said mixture of peroxide is a mixture of (A) an acetyl alkylsulfonyl peroxide having the formula

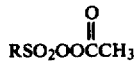

(B) a diacyl peroxide having the formula

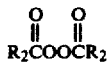

and (C) a tertiary-alkyl neoacid peroxyester having the formula

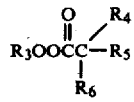

wherein R is alkyl of 4–12 carbon atoms, cycloalkyl of 3–12 carbon atoms, or 1-adamantyl; $R_2$ is primary alkyl of 2–17 carbon atoms; $R_3$ is tertiary alkyl of 4–8 carbon atoms; $R_4$, $R_5$ and $R_6$ are each alkyl of 1–6 carbon atoms; and the weight proportions of component (A) to component (B) are from 1/0.25 to 1/7 and of component (A) to component (C) are from 1/0.25 to 1/5.

11. The process of claim 10 wherein said initiator is a mixture of 1 part by weight of acetyl cyclohexylsulfonyl peroxide, 6.2 parts by weight of lauroyl peroxide, and 2.7 parts by weight of t-butyl peroxypivalate.

12. The process of claim 10 wherein said initiator is a mixture of 1 part by weight of acetyl t-amylsulfonyl peroxide, 2.7 parts by weight of di(3,5,5-trimethylhexanoyl) peroxide, and 1.6 parts by weight of t-butyl peroxyneodecanoate.

13. The process of claim 10 wherein said initiator is a mixture of 1 part by weight of acetyl sec-heptylsulfonyl peroxide, 0.4 part by weight of pelargonyl peroxide, and 0.4 part by weight of 1,1,3,3-tertamethylbutyl peroxypivalate.

14. [The process of claim 1] *In a process for the suspension homopolymerization of vinyl chloride or the suspension copolymerization of vinyl chloride and vinyl acetate, wherein the vinyl chloride constitutes at least 50% by weight of the comonomers, at a temperature of not more than 70° C. in the presence of an initiating amount of a peroxide polymerization initiator, the improvement which comprises using as said initiator a mixture of peroxides in the amount of 0.005% to 1.0% by weight of the monomer(s) being polymerized* wherein said mixture of peroxides is a mixture of (A) an acetyl alkylsulfonyl peroxide having the formula

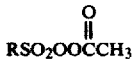

(B) a diacyl peroxide having the formula

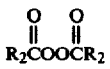

and (C) a peroxy dicarbonate having the formula $$R_1OC(=O)OOC(=O)OR_1$$

wherein R is alkyl of 4–12 carbon atoms, cycloalkyl of 3–12 carbon atoms, or 1-adamantyl; $R_1$ is alkyl of 2–18 carbon atoms, cycloalkyl of 3–12 carbon atoms, or benzyl; $R_2$ is primary alkyl of 2–17 carbon atoms; and the weight proportions of component (A) to component (B) are from 1/0.25 to 1/7 and of component (A) to component (C) are from 1/0.25 to 1/5.

15. The process of claim 14 wherein said initiator is a mixture of 1 part by weight of acetyl cyclohexylsulfonyl peroxide, 3.9 parts by weight of lauroyl peroxide, and 0.7 part by weight of di-sec-butyl peroxydicarbonate.

16. [Claim 1] *Claim 5* wherein the monomer(s) is vinyl chloride.

17. [Claim 1] *Claim 5* wherein the monomer(s) are by weight 85% vinyl chloride and 15% vinyl acetate.

18. In a method for polymerizing vinyl chloride alone or in mixture with vinyl acetate in the presence of a medium which does not dissolve the product, the improvement which comprises using as the catalyst a mixture of acetyl cyclohexyl sulfonyl peroxide with [diisopropyl peroxydicarbonate or] di-2-ethylhexyl peroxydicarbonate.

*19. Claim 10 wherein the monomer(s) is vinyl chloride.*

*20. Claim 14 wherein the monomer(s) is vinyl chloride.*

*21. Claim 10 wherein the monomer(s) are by weight 85% vinyl chloride and 15% vinyl acetate.*

*22. Claim 14 wherein the monomer(s) are by weight 85% vinyl chloride and 15% vinyl acetate.*

* * * * *